United States Patent [19]

Austin et al.

[11] Patent Number: 4,965,084

[45] Date of Patent: Oct. 23, 1990

[54] METHOD OF REDUCING THE IRON CONTENT IN BEVERAGES UTILIZING A PARTICULATE FILTERAID WITH A POLYDENTATE LIGAND

[75] Inventors: F. Jon Austin, Waupaca, Wis.; Don A. Kubose, Fowler, Calif.

[73] Assignee: A. Gusmer Inc., Cranford, N.J.

[21] Appl. No.: 415,643

[22] Filed: Oct. 2, 1989

[51] Int. Cl.$^5$ .............................................. C12H 1/04
[52] U.S. Cl. .................................. 426/422; 210/500.1
[58] Field of Search ................. 426/330.3, 330.4, 422; 210/500.1

[56] References Cited

U.S. PATENT DOCUMENTS

| | | | |
|---|---|---|---|
| 2,701,240 | 2/1955 | Bregar | 502/408 |
| 4,134,857 | 1/1979 | Bradley | 502/401 |
| 4,142,968 | 3/1979 | Nielsen | 210/500.1 |
| 4,187,174 | 2/1980 | Nielson | 502/232 |
| 4,202,910 | 5/1980 | Bradley | 426/423 |
| 4,282,261 | 8/1981 | Greene | 426/330.4 |
| 4,288,462 | 9/1981 | Hou | 426/330.4 |

*Primary Examiner*—Carolyn Paden
*Attorney, Agent, or Firm*—Fitch, Even, Tabin & Flannery

[57] ABSTRACT

The present invention relates to the treatment of particular filteraids to reduce the beverage soluble iron. In the method of the invention, a particulate filteraid, such as diatomite, is contacted with an aqueous solution of particular chelating agents. The process is applicable to treatment of loose filter media and is also applicable to the treatment of filter media in filter sheets. Lowering the pH during the time that the filter media is being contacted by the chelating agent produces an optimum affect.

11 Claims, No Drawings

METHOD OF REDUCING THE IRON CONTENT IN BEVERAGES UTILIZING A PARTICULATE FILTERAID WITH A POLYDENTATE LIGAND

Field of the Invention

The present invention relates generally to the manufacture of particulate filteraids, such as diatomaceous earth and perlite filteraids. More particularly, the present invention relates to a method for reducing the availability of iron in filteraids by treatment of the filteraids with certain chelating agents which method has unusual advantages in relation to beverages.

BACKGROUND OF THE INVENTION

The processing of beverages, such as beer, ale, wine and fruit juices, require clarification steps which involve passing the beverage through filter media. Beds of loose diatomaceous earth and perlite are often used. Filter sheets incorporating diatomaceous earth or perlite with sheet-forming fibers, such as cellulose, are also commonly used. These filter media contain small amounts of various minerals and compounds, among which are iron compounds. A certain portion of the iron content of the filter media is soluble in the beverages which are treated. The portion of the iron which is soluble is referred to in the beverage industry as "beverage soluble iron" (often abbreviated "BSI"). The presence of high levels of BSI dissolved in the beverages is deleterious to the taste and long term stability of the beverages. Consequently, it is desirable to have a filter media which is low in BSI content and which retains desirable filtration and clarification properties.

There are various known processes for reducing the BSI content of filter media, particularly diatomaceous earth or diatomite. For example, U.S. Pat. No. 4,134,857 to Bradley discloses a low beverage soluble iron content filteraid, especially diatomite, which is produced by a method which comprises contacting a granular filteraid with tannic acid, gallic acid or mixtures thereof, preferably in aqueous solution. Also discussed in the Bradley patent is an attempt to use other contacting fluids to determine if there were other materials equivalent to tannic and gallic acids. In particular, water, starch, sucrose, monobasic sodium phosphate, tartaric acid, gluconic acid, salicylic acid, and the sodium salt of ethylene diamine tetra acetic acid were all tried. It is indicated that the organic acids tried in this group produced only insignificant reduction in BSI. It is also indicated that the remaining materials are able to reduce the BSI by larger amounts than the organic acids, but require longer time periods (often ten days to two weeks) to reach the BSI reduction levels obtained with tannic and gallic acid in a matter of minutes.

U.S. Pat. No. 4,187,174 to Nielsen et al. describes a method for treating diatomaceous earth filteraids having a beer soluble iron content of less than about 0.01 percent to further reduce the beer soluble iron content. In the method, the filteraids are maintained in contact with a relatively small volume of an aqueous solution of an acid. The acid solution is added to the diatomaceous earth filteraids at a level of less than about 15 percent by weight, based on the weight of the dry filteraids, which is sufficient, but not in excess to wet the filteraid uniformly. After a period of time, it is indicated that the beer-soluble iron content of the filteraid is reduced by about 30 percent.

Various other acid treatment processes for reducing the beverage soluble iron content of diatomaceous earth are known, such as are described in U.S. Pat. No. 665,652 to Enzinger, U.S. Pat. No. 2,701,240 to Bregar and U.S. Pat. No. 1,992,647 to Schuetz. The prior art methods, however, fail to reduce the beverage soluble content in filteraids to the extremely low levels particularly required in the brewing industry. Further, the known methods involve a lengthy time period for processing or require a complicated or expensive procedure.

Accordingly, it is a primary object of the present invention to reduce beverage soluble iron in filteraids to an extremely low level.

It is a further object to reduce the beverage soluble iron in diatomaceous earth filteraids by a method employing particular chelating agents.

SUMMARY

The present invention relates to the treatment of particulate filteraids to reduce the beverage soluble iron. In the method of the invention, a particulate filteraid is contacted with an aqueous solution of particular chelating agents. The process is applicable to treatment of loose filter media and is also applicable to the treatment of filter media used in filter sheets. Lowering the pH during the time that the filteraid is being contacted by the chelating agent produces an optimum effect.

DETAILED DESCRIPTION OF THE INVENTION

The basic material used in the process of the invention is a particulate filteraid which initially contains beverage soluble iron (BSI). Commercially available filteraids have undergone prior processing which affects the level of the BSI content of the original material. However, most commercially available particulate filteraids do contain an undesirably high level of BSI. For convenience in discussion, the invention will be discussed hereinbelow in terms of the treatment of diatomaceous earth or diatomite, since this is the common and preferred filteraid for beverages. It should be understood, however that the process is also applicable to other particulate filteraids, such as perlite and clay, which contain BSI. The treatment discussed hereinbelow for diatomite is similarly applicable to other particulate filteraids containing BSI.

Diatomite is a naturally occurring material formed by the deposition over many years of the silicious skeletons of microscopic marine organisms known as diatoms. The chemical composition of diatomite is typically 85 to 90 percent silica, 2 to 4 percent alumina, 1 to 2 percent ferric oxide and less than 1 percent of other materials, such as magnesia, lime, alkalies and titanium. There is also typically up to about 5 percent volatile materials including water, carbon dioxide and organics.

After being mined, the diatomite is usually crushed, screened, calcined and classified to separate it into a variety of grades of different granular sizes, purities and reactivities. The grade of diatomite and the steps of handling and processing are not critical to the present invention. The level of BSI of the various grades of diatomite are in part a function of the chemical composition of the original ore and in part a function of the type of processing technique used to produce the commercial grade of diatomite. The present invention is generally applicable to all varieties and grades of diatomite containing beverage soluble iron.

In the process of the present invention the BSI content of diatomite is reduced by contacting the particulate diatomite with an aqueous solution of a chelating agent. Chelation is a chemical reaction or process involving chelate ring formation and is characterized by multiple coordinate bonding between two or more of the electron-pair-donor groups of a multidentate ligand and an electron-pair-acceptor metal ion, in the present case, iron. The multidentate ligand is usually called a chelating agent and the product is known as a metal chelate compound or metal chelate complex.

If a chelating agent has two donor groups capable of attaching to a metal ion, as in ethylene diamine, it is referred to as bidentate; if three, as in diethylene triamine, it is tridentate; if four, tetradentate; five, pentadentate; six, hexadentate; and so on. In general, chelating agents may be designated as polydentate ligands.

In the practice of the present invention, it is preferred to use polydentate ligands which form five or six membered rings. An example of a polydentate ligand which forms a five membered chelate ring is ethylene diamine. An example of a chelating agent which forms a six membered chelate ring is acetylacetonate. Particularly preferred in the practice of the present invention, are polydentate ligands which form fused ring structures. Fused ring structures are formed by tridentate ligands and hexadentate ligands. An example of a suitable tridentate ligand is diethylene triamine. An example of a suitable and particularly preferred hexadentate ligand is ethylene diamine tetracetic acid. Other suitable chelating agents include diethylene triamine pentacetic acid, nitrilo triacetic acid, ethylene-diamine triacetic acid, and polyamino carboxylates and fructo- and heptogluconate.

It is preferred to use a monovalent or divalent cation salt form of the chelating agent, since such salts are generally more soluble. Preferred salt forms of ethylene diamine tetracetic acid are disodium, tetrasodium, calcium disodium, diammonium and tetraammonium. In particular, it is preferred to use the tetrasodium salt of ethylene diamine tetracetic acid. Of course, the chelating agent should be food-safe when treating beverages or edible materials.

In the process of the present invention, the diatomite is treated by contacting the diatomite with an aqueous solution of the chelating agent or mixture of chelating agents. The solution will normally contain from about 0.5 percent to about 3 percent by weight of the chelating agent. All percentages used herein are by weight unless otherwise indicated. Contacting may be accomplished by any of several methods. The chelating agent solution may be sprayed onto the diatomite while the diatomite is suspended in an air stream, i.e., a fluidized bed treatment. Alternatively, the diatomite may be simply washed with a solution of the chelating agent by pouring the solution through a layer of the diatomite. In a preferred method, the contacting is performed by adding the diatomite to an aqueous solution of the chelating agent and agitating the solution for a period of time sufficient to form an iron chelate complex.

The process of the present invention can also be used in the preparation of filter sheets comprising diatomite. The basic process for the manufacture of filter sheets consists of mixing cellulose pulp with diatomite to provide a slurry having from about 2 to about 5 percent solids. The solids preferably comprise from about 30 to about 70 percent of diatomite and from about 70 to about 30 percent of cellulose. The slurry is poured on a screen for dewatering and forming the sheet, and the moist sheet is then dried in an oven. Preferably, the chelating agent is added in the process after the cellulose pulp has been mixed and any desired refining has been accomplished. The diatomite is then added after the chelating agent has been dispersed in the cellulose pulp slurry.

In an important embodiment of the present invention, the pH of a diatomite slurry or a cellulose-diatomite slurry is reduced while the diatomite is in contact with the chelating agent. Preferably, the pH is reduced to below that of the beverage which will be filtered through the treated diatomite filteraid. For beer, having a pH of from about 3.2 to about 3.7, the pH is preferably reduced to a level of about 2.0 to 3.0. It has been found that the reduction of pH during contacting of the diatomite with the chelating agent provides an optimum effect on the reduction of the BSI of the diatomite. In some cases, it is desirable to raise the pH of the diatomite slurry or the cellulose/diatomite slurry after the pH reduction step and prior to dewatering the slurry. If the pH is raised, it is desirable that the final pH of the slurry be in the range of about 5.0 to about 6.0. The combined steps of reducing the pH and subsequently raising the pH are sometimes referred to herein as a "pH excursion".

The following examples further illustrate various features of the present invention but are intended to in no way limit the scope of the invention which is defined in the appended claims.

EXAMPLE I

Filter sheets were prepared by the following general method. Cellulose pulp and broke (trimmings from die cutting of finished sheets) were refined in a beater to provide an aqueous cellulose fiber slurry. The cellulose fiber slurry was pumped to a blending tank provided with a propeller-type agitator. As the cellulose fiber slurry was being pumped over from the beater, the tetrasodium salt of ethylene diamine tetracetic acid (EDTA) was added as a chelating agent at a level of 2% total solids basis. Diatomite was then added and the mixture was agitated for ten minutes. The slurry had 5 percent solids and the solids consisted of 60 percent diatomite and 40 percent cellulose fiber. Acid was added to reduce the pH to within the range of 2.0–2.5. Hydrochloric acid (any strong acid can be used) was used to reduce the pH. Agitation was continued for ten minutes and soda ash was then added at a level sufficient to raise the pH to 5.5–6.0. A melamine resin binder was then added (binder type does not affect performance of the chelating agent). The pH was checked and adjusted to 5.5–6.0 by the addition of soda ash, if required. The lowering and subsequent raising of the pH is referred to herein as a pH excursion. Usual sheet forming and drying steps were then carried out to provide a filter sheet having a thickness of about 4 mm.

The following test apparatus and procedures were used to determine the amount of BSI passing into a beer product from the filter sheets. The filter sheet to be tested was clamped at the bottom of a transparent glass cylindrical container graduated in volume increments. The diameter of the cylinder was 4 cm and the height was 19 cm. The clamp assembly was made such that the filter sheet was supported on a screen to prevent the filter sheet from being ruptured when pressure was applied to push the test fluid through the filter sheet. The top of the cylinder was fitted with a removable closure so that the test fluid (beer) could be poured in and then air pressure applied to push the test fluid through the filter sheet. The effective filter sheet area was 11.2 cm². The nominal volume of the cylindrical container was 300 ml.

Approximately 200 ml. of test fluid (degassed beer with a known iron content) was poured into the container after the filter sheet was clamped to the bottom assembly. 10 psi of air pressure was applied to the container to push the fluid through the filter sheet. Five 40 ml aliquots of the filtrate were collected. The BSI in each aliquot was determined using the American Society of Brewing Chemists (ASBC) method with the Ferrozine Iron Reagent ("Improved Method for Iron Determination in Beer Using Ferrozine", proceedings of the 75th Annual Meeting of the American Society of Brew Chemists, Inc., 3340 Parlot Knob Road, St. Paul, Minn. 55121, May, 1975). From the data obtained, the extent of BSI reduction as a function of volume of test fluid passed was determined.

Production scale (2000 lb batch) filter sheets were made in accordance with the procedure described above containing 2 percent tetrasodium EDTA, and alternatively, 3 percent tetrasodium EDTA. Test results on these filter sheets were shown below in Table I from runs where beer has been passed through a dry filter sheet and through a filter sheet soaked for seven hours in beer prior to determination of BSI.

TABLE I

Flow-Through BSI Values-Production Scale

| Experiment | BSI in Aliquots, ppm | | | | |
|---|---|---|---|---|---|
| | 1 | 2 | 3 | 4 | 5 |
| 2% Dry | 0.18 | 0.070 | 0.025 | 0.006 | 0.002 |
| 7 Hr. Soak | 0.46 | 0.011 | nil | nil | nil |
| 3% Dry | 0.16 | 0.056 | 0.021 | 0.010 | 0.004 |
| 7 Hr. Soak | 0.013 | nil | nil | nil | nil |
| Control (No EDTA) | 0.13 | 0.089 | 0.064 | 0.057 | 0.054 |

EXAMPLE 2

A set of filter sheets were made on a laboratory-scale (approximately ¼ pound batches) to illustrate the effect of the pH excursion. Table II summarizes the results. The pH excursion involved reducing the pH of the diatomite slurry to 2.0 with HCl followed by raising the pH to 5.5 with soda ash.

TABLE II

Flow-Through BSI Values - Laboratory Scale

| Experiment | BSI in Aliquots, ppm | | | | | |
|---|---|---|---|---|---|---|
| | 1 | 2 | 3 | 4 | 5 | 6 |
| 1% EDTA; dry pad (pH excursion) | 0.022 | 0.042 | 0.016 | 0.010 | 0.004 | — |
| 1% EDTA; 7 hr. soak | 0.009 | 0.008 | nil | nil | nil | nil |
| 1% EDTA; no pH, dry | 0.013 | 0.065 | 0.041 | 0.035 | 0.023 | — |
| 1% EDTA; no pH, 7 hr. soak | 0.007 | 0.022 | 0.014 | 0.012 | 0.017 | 0.014 |
| Control; dry pad | 0.036 | 0.11 | 0.085 | 0.054 | 0.040 | — |
| Control; 7 hr. soak | 0.037 | 0.13 | 0.055 | 0.034 | 0.025 | 0.019 |

It can be seen that the pH excursion produces lower BSI values. Aliquot BSI values on the soaked pad (made with pH excursion) are very low (nil) with no BSI spike.

EXAMPLE 3

Loose diatomaceous earth was treated with various concentrations of tetrasodium EDTA using various pH treatments.

The general procedure consisted of adding 100 ml of solution containing tetrasodium EDTA ($5.3 \times 10^{-4}$ to $5.3 \times 10^{-3}$ molar concentration) to 10 g of DE and stirring for approximately 2 minutes. Any pH excursion was done at this time: concentrated hydrochloric acid was used to lower the pH to 2.0-2.5; in instances where the pH was raised again, soda ash was added to bring the pH to 5.5-6.0. The slurry was dewatered via vacuum on filter paper placed in a Buchner funnel. BSI measurements were conducted on the still moist DE using the standard ASBC method.

Three types of DE were examined: flux-calcined; calcined; and natural. The base level of BSI for the three types of DE were: 47.0 mg/kg for flux-calcined; 16.5 mg/kg for calcined; and 17.5 mg/kg for natural.

Table III summarizes the BSI values found for the different DE grades under various conditions.

TABLE III

BSI of Treated Diatomaceous Earth

| Grade | % EDTA | BSI, mg per kg of DE | | |
|---|---|---|---|---|
| | | 1* | 2* | 3* |
| Flux Calcined | 0.2 | .46 | 30.6 | 38.6 |
| | 2.0 | 16.3 | 6.6 | 5.7 |
| Calcined | 0.2 | 10.7 | 10.4 | 5.8 |
| | 2.0 | 4.7 | 7.1 | 4.0 |
| Natural | 0.2 | 14.8 | 29.4 | 11.8 |
| | 2.0 | 1.9 | 8.6 | 1.4 |

1* - EDTA only;
2* - EDTA plus pH lowered;
3* - EDTA plus pH lowered then raised.

A concentration of 0.2% EDTA is not enough to produce a significant BSI reduction (the calcined grade does have a lower BSI when a pH excursion is used). Use of 2% EDTA does produce a significant reduction in BSI for all grades.

The effect of lowering pH is most evident for the flux calcined grade. Also, a permanent reduction in pH as opposed to a pH excursion, affects this grade the least. Leaving the pH at 2.5 for the other grades produces a higher BSI than if the pH excursion is used. The lowering of pH for grades other than the flux calcined grade does not produce significantly lower BSI values. The natural grade shows a higher BSI value than the control if pH is permanently lower when there is an insufficient amount of EDTA (eg., 0.2%). In instances where there is enough EDTA to reduce BSI values, the permanent lowering of pH is detrimental.

EXAMPLE 4

Much of the effort to lower BSI has been conducted using beer since beer is the least tolerant of iron. Experiments using wine have shown filter pads made with tetrasodium EDTA will also prevent iron release to the wine. Experiments with distilled spirits (e.g., whiskey, vodka) showed no advantage of using pads made with tetrasodium EDTA. It is speculated that the difference in behavior of filter pads made with and without the chelating agent is alcohol and pH related; i.e., the effect of the chelating agent becomes more evident at low pH and low alcohol levels. This is evidenced by better performance in the instances of beer (pH 4.7, 3-4% alcohol) and wine (pH 3.5, 10-12% alcohol) vs. the poorer performance for distilled spirits (pH 4–5, 40% alcohol).

EXAMPLE 5

Another chemical class of chelating agents, fructo and gluco heptonates was evaluated in comparative tests with tetrasodium EDTA. Sodium glucoheptonate was found to be less effective than tetrosodium EDTA by a factor of almost four (43.6% vs 12.1% reduction in BSI of flux-calcined DE).

The invention in its broader aspects is not limited to the specific embodiments described herein. Certain modifications will be obvious to those skilled in the art and can be made without departing from the scope and spirit of the invention which is defined in the appended claims.

What is claimed is:

1. A method for reducing the iron content in beverages processed through a particulate filteraid by treating the filteraid prior to use as a filter for beverages by a method comprising contacting a particulate filteraid with a polydentate ligand to provide a treated filteraid, forming said filter aid into filter sheets comprising said filter aid and cellulose pulp and contacting said filter sheets with a beverage so as to form a complex between a substantial amount of beverage soluble iron contained in said beverage with said ligand.

2. A method in accordance with claim 1 wherein said contacting is effected by adding said ligand to an aqueous slurry of said filteraid, the pH of said slurry is reduced to below about 3 an the pH is substantially raised to a level above about 5.0.

3. A method in accordance with claim 1 wherein said contacting is effected by adding said ligand to an aqueous slurry of said filteraid, the pH of said slurry is reduced to below about 3 and said ligand is added to said slurry as a solution of said ligand, said solution having said ligand present at a level of from about 0.5 to about 3 percent by weight.

4. A method in accordance with claim 1 wherein said iron complex is a five or six membered ring.

5. A method in accordance with claim 1 wherein said iron complex is a fused ring.

6. A method in accordance with claim 1 wherein said ligand is selected from the group consisting of ethylene diamine, diethylene triamine, ethylene diamine tetraacetic acid, acetylacetonate, diethylene triamine pentacetic acid, ethylene diamine triacetic acid polyaminocarboxylates, and fructo- and heptogluconate salts.

7. A method in accordance with claim 6 wherein said ligand is ethylene diamine tetraacetic acid.

8. A method in accordance with claim 7 wherein said ethylene diamine tetraacetic acid is a salt form selected from the group consisting of disodium, tetrasodium, calcium disodium, diammonium and tetraammonium.

9. A method in accordance with claim 1 wherein the beverage is selected form the group consisting of beer and wine.

10. A method in accordance with claim 9 wherein the beverage is beer.

11. A method in accordance with claim 1 wherein said filteraid is diatomite.

* * * * *